United States Patent [19]

Gordon

[11] Patent Number: 5,589,942
[45] Date of Patent: Dec. 31, 1996

[54] REAL TIME THREE DIMENSIONAL SENSING SYSTEM

[75] Inventor: Steven J. Gordon, Boston, Mass.

[73] Assignee: Intelligent Automation Systems, Cambridge, Mass.

[21] Appl. No.: 505,722

[22] Filed: Apr. 5, 1990

[51] Int. Cl.$^6$ .................................................. G01B 11/24
[52] U.S. Cl. ........................ 356/376; 250/558; 364/516; 382/151
[58] Field of Search ............................. 356/376; 250/558; 382/1, 151; 364/516

[56] References Cited

U.S. PATENT DOCUMENTS

| | | | |
|---|---|---|---|
| 3,726,591 | 4/1973 | Hebra et al. | 250/558 |
| 4,294,544 | 10/1981 | Altschuler et al. | 356/376 |
| 4,300,836 | 11/1981 | Holmes et al. | 356/376 |
| 4,335,962 | 6/1982 | Di Matteo et al. | 356/376 |
| 4,357,108 | 11/1982 | Stern et al. | 356/376 |
| 4,380,391 | 4/1983 | Buser et al. | 356/5 |
| 4,564,294 | 1/1986 | Halioua | 356/376 |
| 4,593,967 | 10/1986 | Haugen | 350/3.71 |
| 4,634,279 | 1/1987 | Ross et al. | 356/376 |
| 4,641,972 | 2/1987 | Halioua et al. | 356/376 |
| 4,653,104 | 3/1987 | Tamura | 382/1 |
| 4,654,872 | 3/1987 | Hisano et al. | 382/1 |
| 4,705,401 | 11/1987 | Addleman et al. | 356/376 |
| 4,796,997 | 1/1989 | Svetkoff et al. | 356/376 |

OTHER PUBLICATIONS

Echigo & Yachida, *A Fast Method For Extraction Of 3–D Information Using Multiple Stripes And Two Cameras*, 9th IJCAI.

Walker, P., *The Transputer*, Byte Magazine, May 1985.

Pountain, D., *Microprocessor Design*, Byte Magazine, Aug. 1984.

*Primary Examiner*—K. Hantis
*Attorney, Agent, or Firm*—Peter J. Manus, Esq.

[57] ABSTRACT

The invention is a three dimensional sensing system which utilizes two flexibly located cameras for receiving and recording visual information with respect to a sensed object illuminated by a series of light planes. Each pixel of each image is converted to a digital word and the words are grouped into stripes, each stripe comprising contiguous pixels. One pixel of each stripe in one image is selected and an epi-polar line of that point is drawn in the other image. The three dimensional coordinate of each selected point is determined by determining the point on said epi-polar line which also lies on a stripe in the second image and which is closest to a known light plane.

15 Claims, 3 Drawing Sheets

REAL TIME THREE DIMENSIONAL SENSING SYSTEM

STATEMENT OF GOVERNMENT INTEREST

This Invention was made with Government support under Contract No. DE-AC02-88ER80594 awarded by the Department of Energy. The Government has certain rights in this invention.

FIELD OF THE INVENTION

The invention relates to a system for sensing and locating objects in three dimensional space. More particularly, the invention relates to a multi-camera, three dimensional sensing system capable of locating an object by disambiguating reflections of multiple light patterns from a sensed object.

BACKGROUND OF THE INVENTION

Various systems are known in the prior art for sensing objects in three dimensional space and converting information from the sensor or sensors into computer readable digital data from which the position and shape of the object can be determined. Most such systems include a light source for illuminating the object to be sensed and a sensor such as a video camera for recording an impression of the light from the light source which is reflected from the sensed object.

One known system includes a laser light source which emits a single plane of light. The system further includes a camera for recording a video image of the light from the light plane reflected from the sensed object. The light reflected from an object in response to illumination by a plane of light appears on the video image as one or more lines depending on the number of distinct surfaces. The lines may be straight or curved depending upon whether the particular surface of the object from which the light is reflected is flat or curved, respectively.

Assuming that the position in space of the camera and of the incident light plane are known, the position of every illuminated point on the object in three dimensional space can be determined by triangulation. Triangulation can be performed as follows. First, the laser light source illuminates the sensed object substantially greater than does the ambient light. Alternately, the camera may include a filter which passes only light having the wavelength of the light produced by the laser. Thus, any pixel of the video image illuminated with an intensity greater than a predetermined threshold intensity is assumed to reflect light produced by the laser light source. Likewise, all pixel elements which receive an illumination level less than the threshold intensity are assumed to not have received light reflected from the laser light source. Since the position of the camera in space is known, the light which illuminates any single pixel of the display must be reflected from a point in space which exists on a known line drawn from the camera lens center through the image point into space. The position of the light plane in space is also known and, since each and every point which is illuminated by the laser light source must exist on the known plane of the laser light, the exact position of each and every point illuminated by the laser light source can be determined trigonometrically by determining the point at which the known line (from the camera lens to the illuminated point) intersects the known plane. To obtain position information on the entire object, the plane of light can be sequentially scanned (angularly or translationally) a defined amount and the camera can record a second image of reflected light from the sensed object. The light plane can be sequentially moved and video images sequentially recorded until adequate information is obtained to determine the shape and position of the entire object. Alternately, the plane can remain stationary and the object can be moved under the light source. Such embodiments are not preferred, however, because physical scanning is required for these systems and, therefore, they cannot operate in real time.

Other systems exist in which multiple planes of light simultaneously illuminate the object. In a multi-plane system, only a single image frame of the object is recorded. In such a system, a method must be employed for differentiating (or disambiguating) those points which are illuminated by one plane of light from those points which are illuminated by another plane of light. Typically, such systems take an educated guess as to the plane which has illuminated one point of the video image and assumes that other illuminated points directly adjacent the first point in a direction parallel to the plane are also illuminated by the same plane. It is further assumed that the points on either side of the first point in a direction perpendicular to the parallel planes of light are illuminated, respectively, by the immediately adjacent planes of light from the laser light source. Of course, this latter assumption can be incorrect for irregularly shaped objects, and particularly objects with sharp corners between different surfaces. Thus, such systems are not particularly common because they are generally not accurate enough.

U.S. Pat. No. 4,335,962 issued to DiMatteo et al. discloses a three dimensional sensing system employing multiple planes of light and one or more cameras. This system is intended to be operated using a single camera, however, if additional accuracy is required, a second camera can be included. The position of various points on the sensed object is determined by a particular method described in the patent. In order for the method to lead to correct results, however, the primary camera must be positioned within a specified distance of the light source. The camera must be close enough to the light source such that the light reflected from the various light planes will appear to the camera in the same order in which they issued from the light source. Thus, the maximum depth that the sensed object may be is limited as well as the distance between the camera and the light source.

Therefore, it is an object of the present invention to provide a three dimensional sensing apparatus employing multiple patterns of light to illuminate the sensed object and multiple cameras which can be positioned arbitrarily to sense the object.

It is a further object of the present invention to provide a multi-camera, multi-plane three dimensional sensing system which can sense the position and shape of objects of any size.

It is another object of the present invention to provide a three dimensional sensing system which acquires information about a sensed object without mechanical scanning.

It is one more object of the present invention to provide a three dimensional sensing system which can essentially operate in real time.

It is yet a further object of the present invention to provide a three dimensional sensing system which rejects spurious light appearing in the video images.

It is yet another object of the present invention to provide an improved three dimensional sensing system.

SUMMARY OF THE INVENTION

The invention comprises a three dimensional sensing system which utilizes two cameras (hereinafter a left camera and a right camera) for receiving and recording visual information with respect to a three dimensional object to be sensed. The object is illuminated by one or more laser light sources which generate a plurality of simultaneous, spaced planes of light. Each camera simultaneously records a still video image of the light reflected from the sensed object. Each image recorded is the pattern of light created by the reflection of the incident light planes off of the sensed object as seen from the position of each camera. The pixels of the video picture are converted into digital information and stored in computer memory.

After the video images are acquired and converted to digital information, each of the two images is processed independently at first. First, for each image separately, an algorithm is applied to the digital information to collect individual pixels into groups, each group comprising contiguous pixels in the image (hereinafter stripes). The data from the two video images is now combined as discussed below to determine the coordinate location in three dimensional space of any illuminated point of the sensed object.

First, a single pixel of each stripe in one of the video images (e.g., the right) is selected (herinafter the selected pixel). Given that the position of the camera lens in space is known and the selected pixel is known, then it is known that the point corresponding to the selected pixel (hereinafter the selected point) lies on a known line drawn from the lens center out into space. This line (which appears as a point in the right image), appears as a line in the left image. This line is called the epi-polar line of the selected point in the right image. Since the position of the lens center of the left camera also is known, this epi-polar line can be calculated and drawn in the left image. The epi-polar line, when drawn in the left image will intersect at least one, and most likely several, of the stripes of the left video image. It is known that one of the pixels where the epi-polar line and a stripe intersect (hereinafter intersection pixels) represents the selected point from the right image. The actual coordinate location in space of the point corresponding to any of these intersection pixels (hereinafter intersection points) is determinable by simple triangulation. Since the position in space of each plane of light which created the stripes is also known, the single point of all the intersection points which corresponds to the selected point in the right image is ascertained by determining the three dimensional coordinate of each intersection point to determine if it lies in one of the known planes of light. The intersection point which lies closest to a known plane of light is taken as the selected point.

This algorithm is repeated for at least one point in every stripe in the right image. Of course, not every stripe in the right image may have a matching stripe in the left image. It is possible that stripes which appear in the right image, particularly stripes near the edges, will not appear in the left image. In any event, most, if not all, stripes in the right image are matched to stripes in the left image by this algorithm and the three dimensional coordinates of at least one point of each stripe is determined. With this knowledge and the knowledge that every other point in any given stripe lies in the corresponding light plane, the three dimensional coordinates of any other point in the group can be determined by triangulation. Thus, the coordinate location of any illuminated point on the sensed object can be determined.

This information can then be processed and used for a wide variety of industrial and military applications.

DETAILED DESCRIPTION OF A PREFERRED EMBODIMENT

Figure 1:
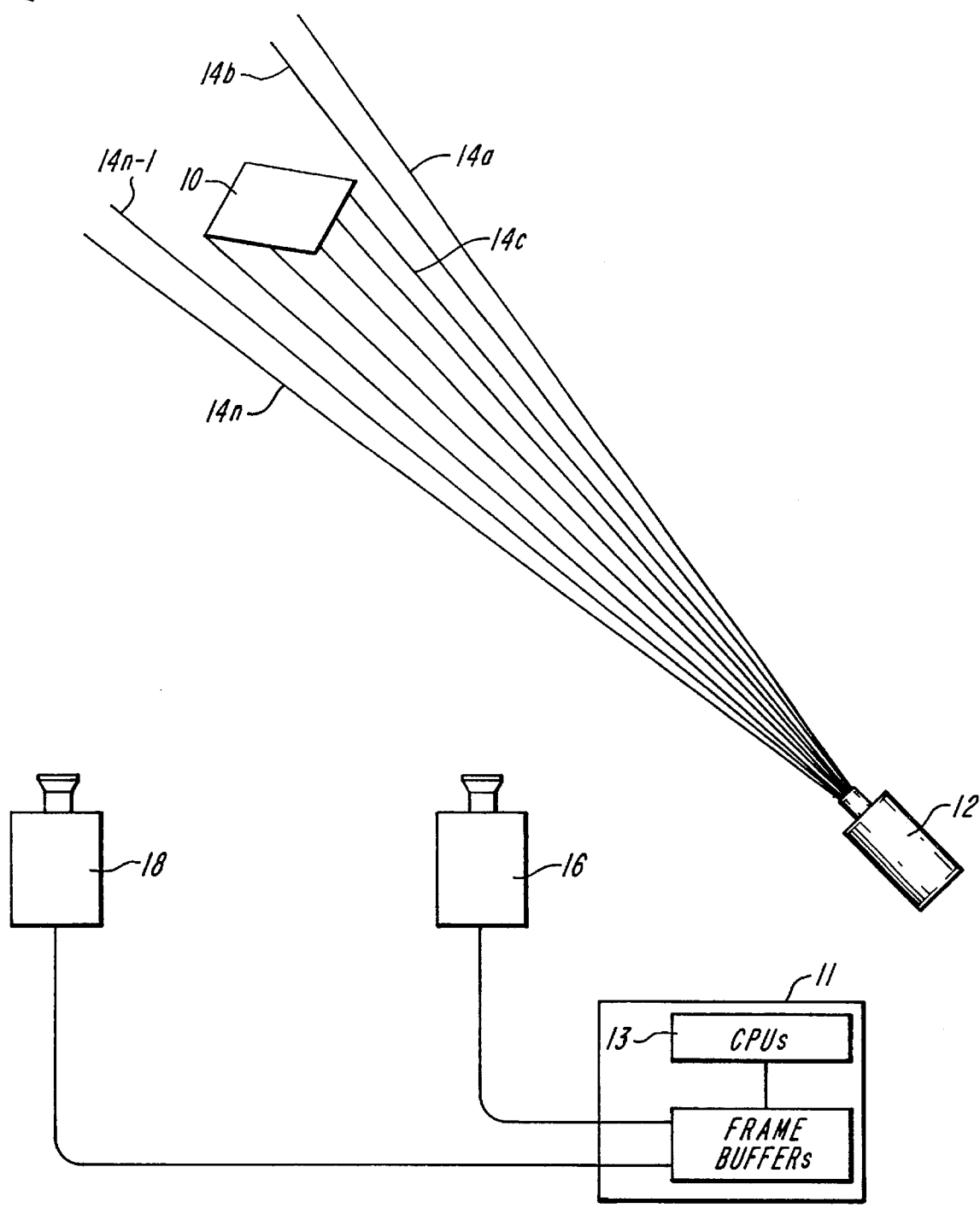
FIG. 1 is a pictorial view of the three dimensional sensing system of the present invention.
Figure 2:
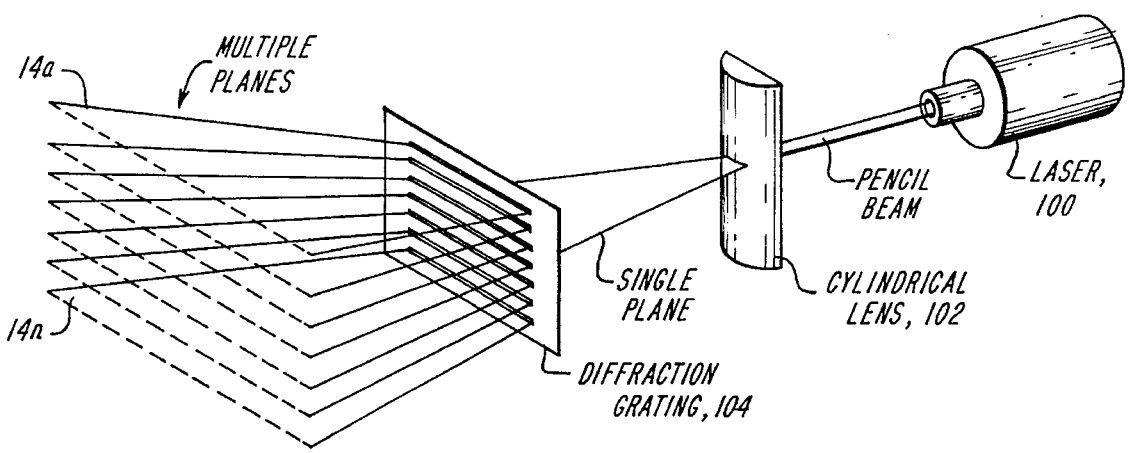
FIG. 2 is a pictorial illustration of one embodiment of the light source shown in FIG. 1.

FIG. 1 pictorially illustrates the general layout of the present invention. The object to be sensed is shown at 10. A light source 12 illuminates the object with a plurality of simultaneous light planes 14a–14n. FIG. 2 shows one embodiment of the light source in which light from a pencil beam laser 100 is passed through a cylindrical lens 102 and then through a diffraction grating 104 to create the series of spaced planes 14a–14n. Multiple laser light sources also may be used. In fact, in certain embodiments, it may be desirable to utilize multiple light sources which are spaced to illuminate the sensed object from various angles so as to fully illuminate all facets of the object.

Right and left video cameras 16 and 18 point in the general direction of the object. Placement of the cameras is extremely flexible but not unlimited. For instance, the cameras should be placed such that the left camera will receive the reflection off of the object of a substantial number of the light planes whose reflection off of the object the right camera will receive. In other words, the cameras should be placed such that a substantial number of stripes in the right image will have matching stripes in the left image. Also, the camera lens centers should not be placed in a single line such that the single line and the plane perpendicular to all the light planes are perpendicular. For example, referring to FIG. 1, which is a plan view of the system of the present invention, cameras 16 and 18 should not both be placed in any one line which is perpendicular to the sheet of paper of FIG. 1 since the light planes are also perpendicular to that plane. Of course, if the light source generates light patterns which are not planar, then this restriction is modified, depending on the actual pattern used.

The object 10 is placed in front of the cameras and each camera records a still image of the object 10 and outputs the information to computer 11. The ambient lighting in the environment of the system should be relatively low in relation to the laser light source 12 or, alternately, the cameras should include filters tuned to the wavelength of the laser light so that the illumination of the object by the laser light source 12 is discernible by the cameras from the ambient light. Therefore, the light from the laser source 12 reflected off of the object 10 into the camera lenses appears in the video images of relatively high intensity while the remainder of the object 10 which is not struck by light from the laser 12 appears in the video images at a relatively low intensity.

Figure 3A:
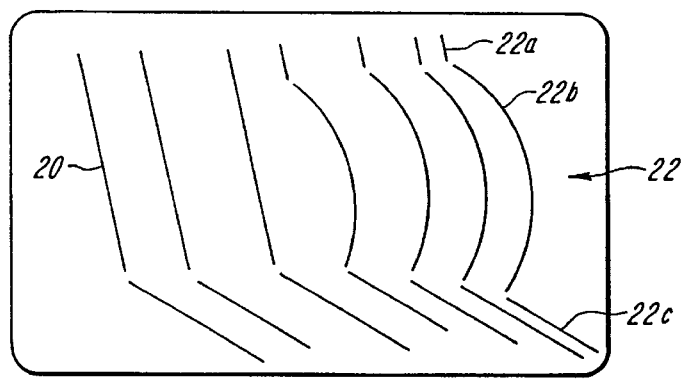
FIG. 3A is a representation of the image recorded by a camera of the object shown in FIG. 3B when the object is illuminated by a plurality of spaced light planes.

FIG. 3A illustrates an example of the video image which might be recorded by a camera of the object shown in FIG.

3B when illuminated by a series of spaced light planes. The lines (e.g. 20 and 22) in FIG. 3A represent portions of the video display which are illuminated to an extent significantly greater than the surrounding areas, that is, by the light source 12. For instance, the left-most plane of light striking the flat surface but not the cylinder would produce straight line (or stripe) 20 shown in FIG. 3. The right-most plane of light, however, strikes the cylinder as well as the flat surfaces and produces a line pattern similar to what is illustrated by stripe group 22 comprising stripes 22a, 22b and 22c. Likewise, each successive plane of light, when reflected off of the sensed object, will produce a group of stripes similar to stripe group 22.

Figure 3B:
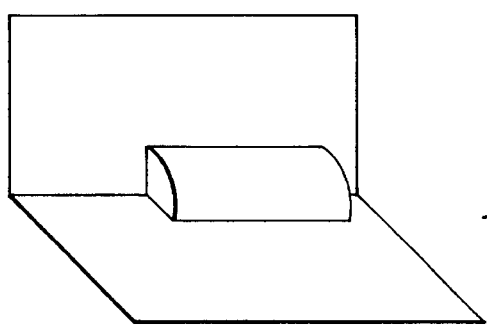
FIG. 3B is pictorial representation of the object whose recorded image is shown in FIG. 3A.
Figure 4A:
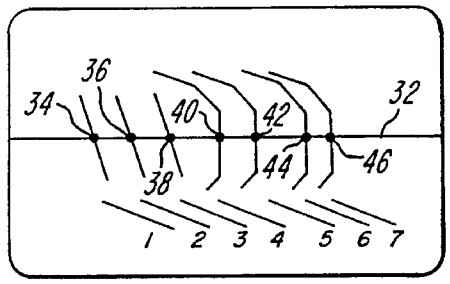
FIGS. 4A and 4B are pictorial representations of the images which would be recorded by the left and right video cameras of the present invention of a sensed object illuminated by a series of planes of light.
Figure 4B:
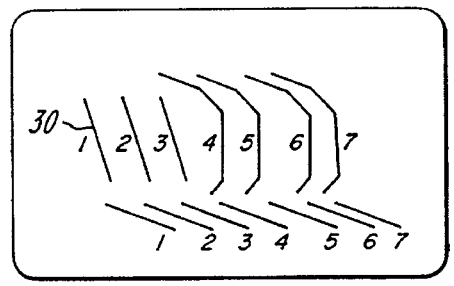

FIGS. 4A and 4B exemplify video images which may be recorded by right and left cameras 16 and 18 of FIG. 1 of the object illustrated in FIG. 3B. Since cameras 16 and 18 view the sensed object 10 from different positions, the video images of FIGS. 4A and 4B are different. If the right and left cameras 16 and 18 are positioned relatively close to each other and view the sensed object from approximately the same angle, as shown in FIG. 1, then the differences between the left and right video images will not be very pronounced, as shown in FIGS. 4A and 4B. The greater the separation of the cameras, the more pronounced will be the differences in the left and right images. Although FIGS. 4A and 4B illustrate a system in which the light planes are vertical, it should be understood that this is not a requirement of the present invention.

In the present invention, each of these images is converted into digital information and stored in memory in a frame buffer 15 which is accesible to the CPU 13 of computer 11. Essentially, the pixels of the video image are converted into multi-bit pixel data words representative of the intensity of the illumination of the associated pixel. It is not necessary that the data words have a one to one correspondence with the pixels of the video image. For instance, if the video image has a much higher resolution (number of pixels) than is necessary for the purposes of the sensing system, then a plurality of proximate pixels may be converted into a single data word in the computer memory. Thus, the terms pixel data word and pixel when used in relation to the data stored in the computer do not connote any particular correspondence to the pixels of the video image. In addition, the data from the video cameras may be further conditioned before being stored in memory.

The still images recorded by the two cameras should be taken simultaneously in order to assure that an image of the same scene is recorded. However, if the sensed object 10 is stationary, synchronization of the cameras is not of particular concern. Those pixel words which have an illumination intensity above a predetermined threshold level are assumed to have been illuminated by one of the light planes of the laser light source 12. The remaining pixel words having an illumination intensity less than the predetermined intensity level are discarded. This is done for both the left and right video images.

Unlike the prior art systems which use a single light plane, with multiple light planes, it is not possible to determine the three dimensional point illuminated in a certain pixel by triangulation of the plane with the line drawn through the camera lens center since it is not known which of the multiple planes of light illuminated the point.

It should be understood that it cannot be assumed that the right-most point of light in the video image is illuminated by the right-most incident light plane since, the shape of an object may cause the reflection of any given plane to appear out of order with respect to the incident planes.

After the image is acquired, digitized and divided into pixels illuminated by the laser light source and pixels not illuminated by the laser light source, the illuminated pixels are collected into groups of contiguous points, i.e. stripes. One light plane may generate one or more stripes depending on the shape of the sensed object. Algorithms are known which accurately group pixels of a video image into stripes. One such algorithm is performed on each image to collect the illuminated pixels into these stripes. Sometimes two or more stripes will appear aligned with each other in an image and, therefore, appear as one stripe. These stripes cannot be separated at this point in the processing of the signals. Algorithms are known, however, which can be used at later points in the processing to separate these types of stripes.

Figure 5:
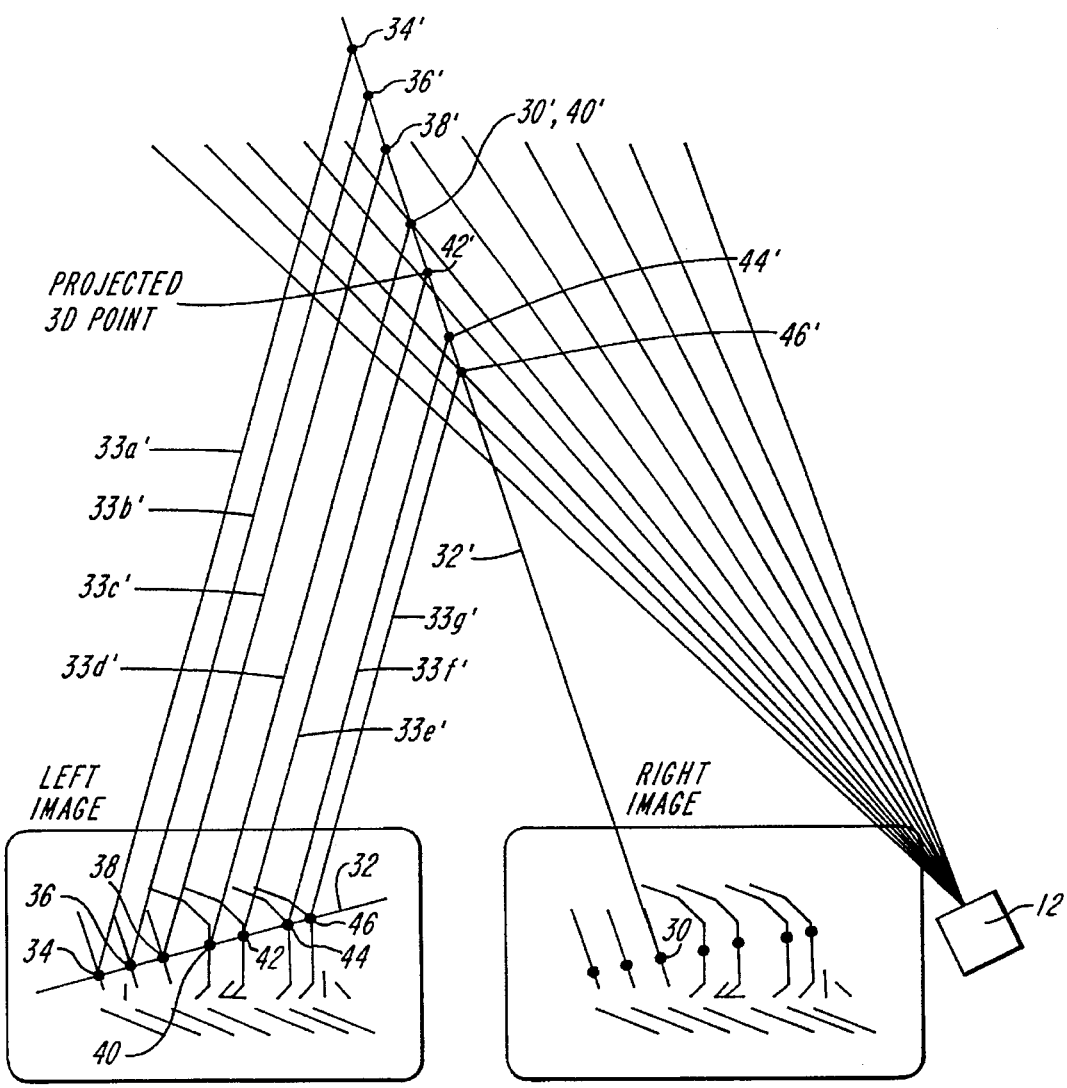
FIG. 5 is a pictorial representation of recorded video images superimposed on a pictorial representation of the light planes of the present invention which produced the video images.

In order to determine the three dimensional position of any illuminated point, it must be determined which light plane illuminated it. The present invention does this by matching the stripes in the left image to the stripes in the right image. This process will be described in relation to FIG. 5 which shows exemplary left and right video images imposed on a plan view of the light source and light planes of the present invention. In FIG. 5, the prime symbol, ', is used in conjunction with reference numerals which represent actual physical points or lines, while a pixel or line in a video image corresponding to the physical point or line is denoted with the same reference numeral without the prime symbol. In order to further simplify the figure, the sensed object is not shown. In accordance with the present invention, a random pixel in each stripe in one image is selected, e.g., pixel 30 in the right image (hereinafter the selected pixel). In the preferred embodiment, the pixel at the center of the stripe is chosen. Since the position of the right camera 16 is known, and the position of the selected pixel 30 is known, a line 32' can be drawn from the center of the right camera lens out into space upon which the selected point 30' represented by the selected pixel 30 is known to lie. However, the exact location of the selected point 30' on line 32' (i.e., the distance from the camera) is unknown.

Line 32', which appears only as a pixel, selected pixel 30, in the right image, appears as a line in the left image. Since the position of the line in space is known and the position of the left camera is also known, the location of the line 32' can be calculated and drawn as shown at 32 in the left image. Line 32 is termed an epi-polar line of the selected pixel 30. The pixel in the left image corresponding to point 30' is known to lie on line 32 in the left image. Since it is also known that the selected point 30' must lie in one of the light planes, the position in space of the selected point 30' can be further narrowed to correspond to one of the pixels 34, 36, 38, 40, 42, 44 or 46 where line 32 intersects stripes in the left image (hereinafter intersection pixels).

The exact three dimensional coordinate of selected point 30' can now be determined as follows. The three dimensional coordinates of each of the intersection points 34', 36', 38', 40', 42', 44' and 46' corresponding to intersection pixels 34, 36, 38, 40, 42, 44 and 46, respectively, can be determined by triangulation since each point is known to lie on two separate lines: The first line being line 32' and the second line being one of lines 33'a–33'g drawn from the center of the lens of the left camera 18 out into space through one of the respective intersection points 34', 36', 38', 40', 42', 44' and 46'. The location of each of the intersection points is known to be the intersection of the two lines and can be determined by triangulation.

Further, the location in space of each light plane is also known from the known position of the light source 12. Of the intersection points 34', 36', 38', 44', 42', 44' and 46', the one that lies on one of the known planes should be the same point as selected point 30'. Thus, an algorithm is applied to each of the intersection points 34', 36', 38', 40', 42', 44', 46' to determine which is closest to one of the known planes. The intersection pixel in the left image which corresponds to the intersection point which is closest to a known plane (e.g. point 40') is assumed to be the same point as selected point 30'. If there are two or more intersection points which lie very close to a light plane, then further steps may be necessary to determine the correct intersection point. One possibility is to compare the length of the stripes corresponding to each of the two or more intersection points in the left image with the stripe corresponding to the selected pixel in the right image and select the intersection point corresponding to the stripe from the left image whose length is closer to the length of the stripe in the right image corresponding to the selected pixel. Another possibility when two or more intersection points lie very close to light planes is to simply select another point in the right image on the same stripe and re-perform the algorithm on the new selected point.

The position in space of the intersection points and selected point can be determined by use of other types of coordinate systems, such as polar coordinates. For instance, all of the light planes are known to be generated from a single line in space and radiate outwardly from that line at specified angles. The intersection points corresponding to the intersection pixels in the second image may be defined in terms of an angle about the generation line and a distance vector from a selected point on the generation line. The angle associated with each of the intersection points can be compared with the known angles of the light planes to determine which of the intersection points lies closest to a light plane.

At this juncture, the three dimensional coordinates of selected point 30', the light plane on which selected point 30' lies, and the stripe in both the left and right images on which selected point 30' lies are all known. It is also known that all other points in the stripe to which pixel 30 belongs are illuminated by the same light plane. Thus, the three dimensional location of any other point on the associated stripe can be determined by simple triangulation.

The same algorithm is applied to the center pixel of every other stripe in the right image to determine the three dimensional coordinate of the corresponding point in space. As mentioned above, some stripes in the right image may not have a corresponding stripe in the left image. The above-described algorithm will determine which stripes do not have matches. Further, if there are any aligned stripes which were not be disambiguated earlier, known algorithms can be applied at this point to separate them.

The algorithm in the present invention has further advantages in that it inherently rejects spurious light reflections such as may be caused by the ambient light or by secondary reflections of the light planes off of the object. Most spurious light in the video images will not be within a light plane and thus, when the present invention attempts to match the pixel in the right image corresponding to a spurious light with the corresponding pixel in the left image, it will find no intersection point which lies in a light plane. The system will then assume that the pixel was illuminated by spurious light. In this manner, most pixels illuminated by spurious light will be rejected.

After the stripes in the video images are matched to the actual light plane which generated it, the three dimensional coordinates of any illuminated point in the video image can be determined by triangulation using data from a single camera. However, in application requiring high accuracy, the system may be modified to determine the co-ordinates of points based on data from each camera and average the two sets of data.

Thus, the data obtained defines the sensed object 10. This data can be manipulated as needed for the particular application. For instance, in a manufacturing environment, the present invention may be utilized to locate the position of an object to be drilled. Then, under computer control the drill can be brought to the desired position for the drilling operation. In military applications, the present system may be used for target acquisition purposes. For instance, when an object having a predetermined shape and/or size is located, and its three dimensional coordinates determined, a weapon can be automatically trained onto the indicated coordinates.

The present invention can be implemented primarily in software. However, in order to quicken the response time of the system, i.e. the time between acquisition of the image and final calculation of the position and shape of the image, hardware can be designed to perform certain of the steps. For instance, hardware can be designed to collect the illuminated pixels into stripes.

To further reduce the response time of the system, the method of the present invention can be performed by a series of parallel processors. In the preferred embodiment, the acquired video images are broken into portions, each of which can be operated on by a separate processor. For instance, assuming the light planes are approximately vertical in the video images, the images can be divided into horizontal sections, each of which is operated on by a separate processor. Alternately, a processor can be dedicated to each stripe or a group of stripes. The data can then be combined after the three dimensional coordinates of the points are determined. However, in many applications it may not even be necessary to combine the data developed by the separate processors.

As a further alternative, multiple processors can be pipelined to perform different portions of the algorithm, also reducing the response time. In addition, by using hardware to perform certain stages of the processing and using multiple processors, the response time of the system (i.e., the period required to generate useful information from the acquired image) can be reduced to approximately $\frac{1}{10}$ of a second. With a response time of $\frac{1}{10}$ of a second, the system can essentially operate in real time whereby the system can track a moving object and continually update the position and/or shape information with a $\frac{1}{10}$ second delay.

The above description pertains to a preferred embodiment. However, various other embodiments are envisioned. For instance, it is not necessary that the images be recorded by video cameras. Any electromagnetic recording means can be used in conjunction with a compatible electromagnetic radiation source. For instance, the sensed object may be bombarded with X-rays and the images may be recorded by an X-ray imaging machine.

While the invention has been described in relation to a source which illuminates the object with multiple planes of light, other illumination patterns are possible. For instance, the object instead may be illuminated by a series of concentric circles or squares or by an array of pencil beams. In fact, the object may be illuminated by any number of patterns of light as long as the position of the laser and the light pattern is known. Thus, the term "stripes" as used herein does not refer only to straight lines but should be construed more broadly to include the reflection pattern created by any one of a set of multiple, repetitive patterns. Note, however, that in the case of a light pattern consisting of a series of pencil beams, there would be no grouping of pixel data words into stripe (or alternately stated, each pixel illuminated by a pencil beam would be its own stripe).

Having thus described a few particular embodiments of the invention, various alterations, modifications and improvements will readily occur to those skilled in the art. Such alterations, modifications and improvements as are made obvious by this disclosure are intended to be part of this description though not expressly stated herein, and are intended to be within the spirit and scope of the invention. For instance, it is not necessary that the object be simultaneously illuminated by multiple planes (or any other pattern) of light. The light planes instead may be generated sequentially in time by a single plane of light which is sequentially displaced a known amount. If ambient lighting is low enough to maintain the integrity of the video picture, a long-time exposure single video image may be recorded by the cameras as the light planes are generated. Alternately, a separate image may be recorded after each displacement of the light plane. Accordingly, the foregoing description is by way of example only, and not limiting. The invention is limited only as defined in the following claims and equivalents thereto.

What is claimed is:

1. A three dimensional object sensing apparatus comprising:

an electromagnetic radiation source for illuminating an object to be sensed with a plurality of electromagnetic radiation patterns, first and second electromagnetic recording means for recording first and second images, respectively, of the reflection of said patterns off of said object as it is illuminated by said electromagnetic radiation source, wherein said first and second electromagnetic recording means are positioned in any manner relative to each other such that said first electromagnetic recording means records an image containing at least some of the reflected patterns which said second electromagnetic recording means records, and data processing means for correlating the reflections of each of said patterns as recorded by said first recording means with the reflection of each of said patterns as recorded by said second recording means and determining the shape or position of said object therefrom, wherein said data processing means comprises;

means for converting each of said images into a series of digital pixel words, means for grouping said digital pixel words of each image into stripes, each stripe comprising the digital pixel words corresponding to points illuminated by a single one of said patterns, means for selecting a single digital pixel word from each stripe from said first image, each of said selected digital pixel words representing a selected point on said object which is illuminated by the associated pattern, means for determining an epipolar line in said second image associated with each of said selected digital pixel words, means for determining each digital pixel word representing a point in said second image which is both part of a stripe in said second image and part of an epipolar line, said points termed intersection points, means for determining the three dimensional coordinate of each of said intersection points, means for selecting the single intersection point on each of said epipolar lines which lies closest to one of said patterns as the selected point from said first image associated with each of said epipolar lines, and means for determining the shape or position of said object based on the known position of said selected points.

2. An apparatus as set forth in claim 1 wherein said electromagnetic radiation source comprises a light source and said patterns comprise a plurality of light planes.

3. An apparatus as set forth in claim 1 wherein said first and second images are captured simultaneously.

4. An apparatus as set forth in claim 1 further comprising;

means for separating said images into sections, said sections in said first and second images comprising corresponding pixels of said images, and wherein said data processing means comprises a plurality of data processing means, each of said data processing means operating simultaneously on one of said sections of said first and second video images.

5. An apparatus as set forth in claim 4 wherein said sections each comprise a stripe of the associated image.

6. An apparatus as set forth in claim 1 wherein said grouping means comprises;

means for separating said pixels into first and second groups, said first group comprising pixels illuminated at a level above a specified threshold illumination level and said second group comprising pixels illuminated at a level below said threshold level, and means for further separating said pixels from said first group into said stripes.

7. An apparatus as set forth in claim 1 wherein said electromagnetic recording means comprise video cameras.

8. An apparatus as set forth in claim 2 wherein said light source comprises a laser light source.

9. An apparatus as set forth in claim 1 wherein said data processing means comprises a plurality of pipelined data processing means, each of said data processing means performing a sequential portion of said data processing.

10. An apparatus as set forth in claim 1 further comprising means for rejecting a selected digital pixel word if none of the intersection points lie within a specified distance of any of said patterns.

11. A method for sensing an object in three dimensional space, said method comprising the steps of:

illuminating said object with a pattern of electromagnetic radiation, obtaining first and second images of the reflection of said light pattern off of said object, said images comprising pixels, correlating the reflection of said light pattern as recorded by said first camera with the reflection of said light pattern as recorded by said second camera by first determining the position of an epi-polar line in said second image of at least one selected pixel from said first image, then determining the position in space of the point corresponding to each of said pixels in said second image which lies on said epi-polar line, and thereafter determining which of said points lies closest to said light pattern.

12. A method for sensing an object in three dimensional space, said method comprising the steps of:

illuminating said object with a plurality of patterns of electromagnetic radiation, obtaining first and second images of said object, converting each image into a series of pixel words, each pixel word representing the intensity level of a point on said video image, collecting said pixel words of each image into stripes, each stripe comprising contiguous pixels illuminated above a specified threshold intensity, selecting a single pixel word from each stripe from said first image, for each selected pixel word, determining the position of an epi-polar line in said second image of said selected pixel word, for each epi-polar line, determining each pixel word from said second image which is both part of a stripe and part of said epi-polar line in said second image, these pixel words termed intersection words, for each epi-polar line, determining the three dimensional coordinates of the point corresponding to each intersection word, for each epi-polar line, selecting the single intersection word whose corresponding point lies closest to one of said patterns, and determining the shape or position of said object based on the known positions of said points corresponding to said selected pixel words.

13. A method as set forth in claim 12 wherein said first and second images are captured simultaneously.

14. A method as set forth in claim 12 wherein said grouping step comprises the substeps of;

separating said pixel words into first and second groups, said first group comprising pixel words having a value above a specified threshold value and said second group comprising pixel words having a value below said specified threshold value, and separating said pixels in said first group into said stripes.

15. A method as set forth in claim 12 further comprising the step of rejecting a selected pixel word if none of the points corresponding to the intersection words lies within a specified distance of any of said patterns.

\* \* \* \* \*